Dec. 19, 1967
L. TIGANIK
3,359,336
MANUFACTURE OF PENTACHLOROBENZENE
Filed April 20, 1964
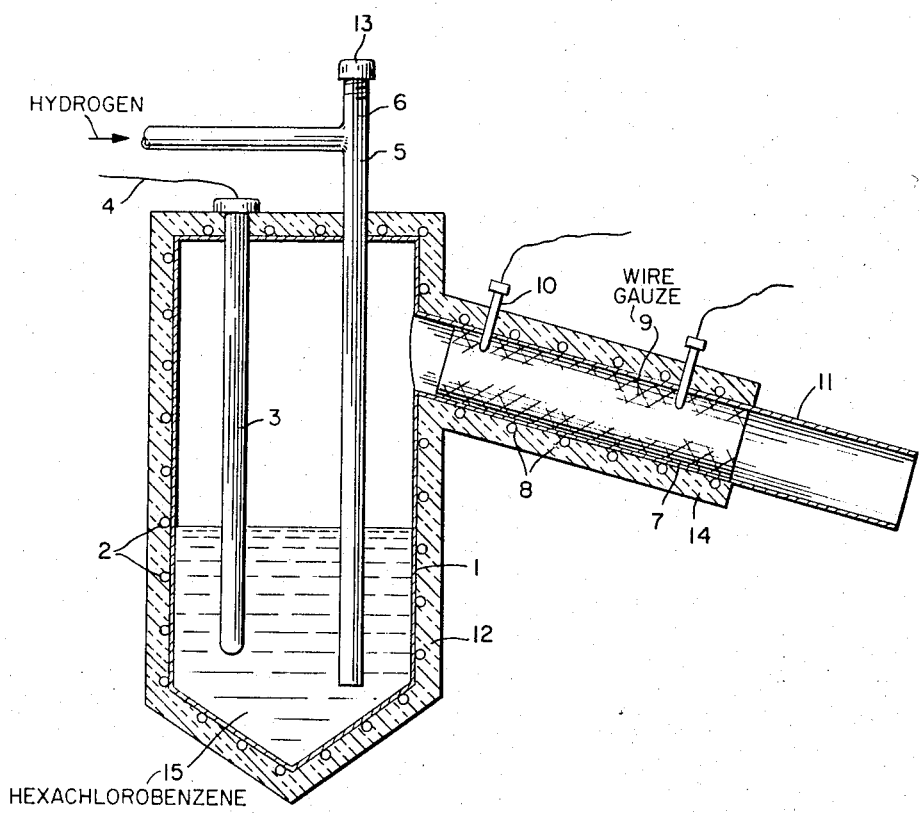
*INVENTOR.*
LEONHARD TIGANIK

United States Patent Office 3,359,336
Patented Dec. 19, 1967

3,359,336
MANUFACTURE OF PENTACHLOROBENZENE
Leonhard Tiganik, Skoghall, Sweden, assignor to Uddeholms Aktiebolag, Uddeholm, Sweden, a company of Sweden
Filed Apr. 20, 1964, Ser. No. 361,073
Claims priority, application Sweden, Apr. 24, 1963, 4,511/63
2 Claims. (Cl. 260—650)

It is known that pentachlorobenzene can not be manufactured with a high yield by the direct chlorination of benzene. A substantially complete chlorination of benzene produces tetra and hexachlorobenzene, but little pentachlorobenzene. The same is true for so called oxychlorination of benzene or hexachlorocyclohexane with hydrogen chloride and air.

It is true that pyrolysis of dichlorobenzene hexachloride gives pentachlorobenzene in a high yield, but the starting product for the reaction, octachlorocyclohexane, must be produced from dichlorobenzene by photochlorination, which is a complicated method.

One has also tried to produce pentachlorobenzene by treating hexachlorobenzene with hydrogen in the presence of CuCl as a catalyst. However, this method is not very selective, in that it produces, besides pentachlorobenzene, lower chlorinated benzenes.

According to the present invention is has surprisingly been found that the reduction of hexachlorobenzene with hydrogen or another hydrogen-containing substance practically completely leads to pentachlorobenzene if it is carried out in gas phase at a temperature of 350–500° C. At a lower temperature the reduction is too slow, and at a higher temperature the selectivity ceases, so that also lower chlorinated benzenes are formed. We prefer working at about 400°–450° C.

An interesting detail of the method according to the invention is that a black graphitoid coating deposits spontaneously on the walls of the reaction space. Said coating obviously serves as a catalyst for the continued reaction, which is considerably faster after the formation of a noteworthy amount of coating. To utilize the catalyzing effect of the coating we prefer to enlarge the walls of the reaction space by introducing therein a carrier with a large surface, on which the graphitoid coating can deposit. As an example of such a carrier bodies of graphite and metal wire gauze can be mentioned. The carrier may be movable, for instance bodies being kept floating in a fluidized bed.

The amount of the graphitoid coating increases very slowly during the reaction at the above mentioned temperature. Now and then it may be necessary to remove a part of the coating. This is suitably accomplished by stopping the reduction and passing air through the reaction space at about 300–350° C. until a part of the coating has been burned away.

During the reduction, however, no air is admitted in the reaction space, as this results in that the catalysing effect of the coating decreases or ceases. Therefore, the reaction components shall preferably be free from oxygen. The poisoning effect of the oxygen on the catalyst is probably due to the formation of tar-like products which inactivate the catalyst or to the structure of the catalyst-crystals being affected by oxygen (cf. T. D. Smith, Journ. Chem. Soc., London, 1952, 923). If this has happened the surface layer of the coating can be burned away as described above until an active catalyst surface has been restored.

Useful reducing substances are hydrogen, ammonia, and lower hydrocarbons having up to 8 carbon atoms, such as methane, hexane, benzene. The following two examples illustrate the reduction with hydrogen and ammonia.

*Example 1*

A container was charged with hexachlorobenzene and heated to a temperature of 285–290°. Through a gas distributor hydrogen gas was supplied, having been freed in a known way from oxygen by having been passed over a glowing platinum-asbestos-catalyst. The gaseous mixture of hexachlorobenzene and hydrogen was approximately equimolecular and was supplied into a reaction chamber containing a steel wire gauze. The temperature of the chamber was kept at about 425°. The conversion of hexachlorobenzene to pentachlorobenzene was about 25%, whereas the yield of pentachlorobenzene was about 97%, based on the supplied hexachlorobenzene. The remaining 3 percent were mainly tetrachlorobenzene.

*Example 2*

This experiment was made in the same apparatus and under similar conditions as in Example 1. The container with hexachlorobenzene was kept at 280–285°. Gaseous ammonia was supplied through the gas distributor. The gas mixture thus produced contained about 1 mole hexachlorobenzene per 2 moles of ammonia. The temperature in the reaction chamber was kept at about 500°. The conversion was about 30% and the yield of pentachlorobenzene was about 95%.

The conversion may be increased by increasing the temperature in the two examples mentioned above but this results in a decreased yield owing to the formation of a larger amount of lower chlorinated products. The capacity of the apparatus may be substantially increased by increasing the content of hexachlorobenzene in the supplied gas mixture, but this measure results in a lower conversion.

In addition to pentachlorobenzene the reaction product contains large amounts of unreacted hexachlorobenzene and small amounts of lower chlorinated products. A first separation is suitably carried out by distillation, so as to remove the hexachlorobenzene substantially completely. The pentachlorobenzene thus produced contains as an impurity mainly tetrachlorobenzene. These two substances can be separated by crystallization from alcohol.

The accompanying drawing illustrates an apparatus which can be used for operating the process of the invention.

The apparatus comprises a vessel 1 which can be heated by an electric coil 2. The vessel is enclosed by a heat insulation 12. The vessel contains a tube 3 for a thermocouple element 4 and a tube 5 for the supply of gaseous reducing agent. The top portion 6 of the tube 5 is closed by a plug 13 which can be removed for allowing the tube 5 to be cleared.

The vessel 1 is connected to a reaction chamber consisting of a tube 7 which can be heated by an electric coil 8 and which is partially enclosed by a heat insulation 14. The tube 7 contains two thermocouple elements 10 and a metal wire gauze 9. The end portion 11 of tube 7 serves as a cooler, as it has no heating coil or heat insulation.

The gas supplied through tube 5 bubbles through the molten hexachlorobenzene 15, and the resulting gaseous mixture passes through the reaction chamber 7. The reaction product condenses in cooler 11.

What is claimed is:

1. A method for the production of pentachlorobenzene which comprises passing an oxygen-free gaseous mixture consisting essentially of hexachlorobenzene and a hydrogen-containing material selected from the group consisting of hydrogen and ammonia over and in contact with a carrier at a temperature within the range from 350 to 500° C. whereby a graphitoid material deposits on said carrier and then continuing to passing said gaseous mixture over and in contact with said graphitoid material at said temperature.

2. Process as defined in claim 1 in which the passing of said gaseous mixture is interrupted, a portion only of said deposit of graphitoid material is removed by passing air over and in contact therewith at a temperature within the range from 300 to 350° C. and the passing of said gaseous mixture is then continued.

References Cited
UNITED STATES PATENTS

| | | | |
|---|---|---|---|
| 2,726,271 | 12/1955 | Troyan et al. | 260—650 |
| 2,886,605 | 5/1959 | McClure et al. | 260—650 |

LEON ZITVER, *Primary Examiner.*

N. J. KING, H. MARS, *Assistant Examiners.*